United States Patent
MacNeille et al.

(10) Patent No.: US 11,190,267 B2
(45) Date of Patent: Nov. 30, 2021

(54) VEHICLE-TO-VEHICLE COMMUNICATION USING DRONES FOCUSING ANTENNA BEAMS

(71) Applicant: Ford Global Technologies, LLC, Dearborn, MI (US)

(72) Inventors: Perry Robinson MacNeille, Lathrup Village, MI (US); Jeffrey Anthony Hamel, Berkley, MI (US); John Jeffrey Pfeiffer, Saline, MI (US); Doug Moore, Southfield, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/639,802

(22) PCT Filed: Aug. 24, 2017

(86) PCT No.: PCT/US2017/048485
§ 371 (c)(1),
(2) Date: Feb. 18, 2020

(87) PCT Pub. No.: WO2019/040072
PCT Pub. Date: Feb. 28, 2019

(65) Prior Publication Data
US 2021/0126703 A1    Apr. 29, 2021

(51) Int. Cl.
*H04B 7/185* (2006.01)
*H04W 16/28* (2009.01)
(Continued)

(52) U.S. Cl.
CPC .......... *H04B 7/18506* (2013.01); *H04W 4/46* (2018.02); *H04W 16/28* (2013.01); *H04W 84/005* (2013.01)

(58) Field of Classification Search
CPC .............. H04B 7/18504; H04B 7/0617; H04B 7/18502; H04B 7/18506; H04B 1/0483;
(Continued)

(56) References Cited

U.S. PATENT DOCUMENTS

| | | |
|---|---|---|
| 4,021,813 A | 5/1977 | Black et al. |
| 5,521,817 A | 5/1996 | Burdoin et al. |

(Continued)

FOREIGN PATENT DOCUMENTS

| | | |
|---|---|---|
| WO | 2016/003430 A1 | 1/2016 |
| WO | 2016195765 A1 | 12/2016 |
| WO | 2017014833 A1 | 1/2017 |

OTHER PUBLICATIONS

Li et al., "Development and Testing of a Two-UAV Communication Relay System", Sensors 2016, 16, 1696; doi:10.3390/s16101696, www.mdpi.com/journal/sensors.
(Continued)

*Primary Examiner* — Philip Sobutka
(74) *Attorney, Agent, or Firm* — Brandon Hicks; Bejin Bieneman PLC

(57) ABSTRACT

A drone communication system is described. Using the system, a method may be executed that includes: when a recipient vehicle is out of wireless range, transmitting a message, from a sending vehicle, to a plurality of drones that are focusing antenna beams on the sending vehicle so that the plurality then may transmit the message to the recipient vehicle by focusing antenna beams thereon.

17 Claims, 6 Drawing Sheets

(51) Int. Cl.
*H04W 4/40* (2018.01)
*H04W 4/46* (2018.01)
*H04W 84/00* (2009.01)

(58) Field of Classification Search
CPC .............. H04B 1/3822; H04B 7/0408; H04B 7/0413; H04B 7/0456; H04B 7/0695; H04B 7/086; H04B 7/1555; B64C 2201/122; H04W 84/005; H04W 16/28; H04W 4/40; H04W 4/46; H04W 16/26; H04W 4/44; H04W 4/90; H04W 84/06
See application file for complete search history.

(56) References Cited

U.S. PATENT DOCUMENTS

| | | | |
|---|---|---|---|
| 6,018,659 A | 1/2000 | Ayyagari et al. | |
| 8,503,941 B2 | 8/2013 | Erdos et al. | |
| 9,104,201 B1 | 8/2015 | Pillai et al. | |
| 9,494,937 B2 | 11/2016 | Siegel et al. | |
| 9,571,180 B2 | 2/2017 | Jalali et al. | |
| 9,590,298 B1 | 3/2017 | Buchmueller et al. | |
| 10,219,140 B2 | 2/2019 | Anjum et al. | |
| 2014/0241239 A1* | 8/2014 | Chang | H04B 7/18504 370/316 |
| 2014/0286235 A1 | 9/2014 | Chang | |
| 2015/0236778 A1 | 8/2015 | Jalali | |
| 2015/0237569 A1 | 8/2015 | Jalali | |
| 2017/0023939 A1 | 1/2017 | Krouse et al. | |
| 2017/0085307 A1 | 3/2017 | Yazdani et al. | |
| 2017/0126309 A1* | 5/2017 | Rupasinghe | H04B 7/0617 |
| 2017/0164178 A1 | 6/2017 | Anjum et al. | |

OTHER PUBLICATIONS

Tonetti et al., "Distributed Control of Antenna Array with Formation of UAVs", 18th IFAC World Congress, Aug. 28-Sep. 2, 2011, Milano, Italy.
International Search Report of the International Searching Authority for PCT/US2017/048485 dated Dec. 20, 2017.

* cited by examiner

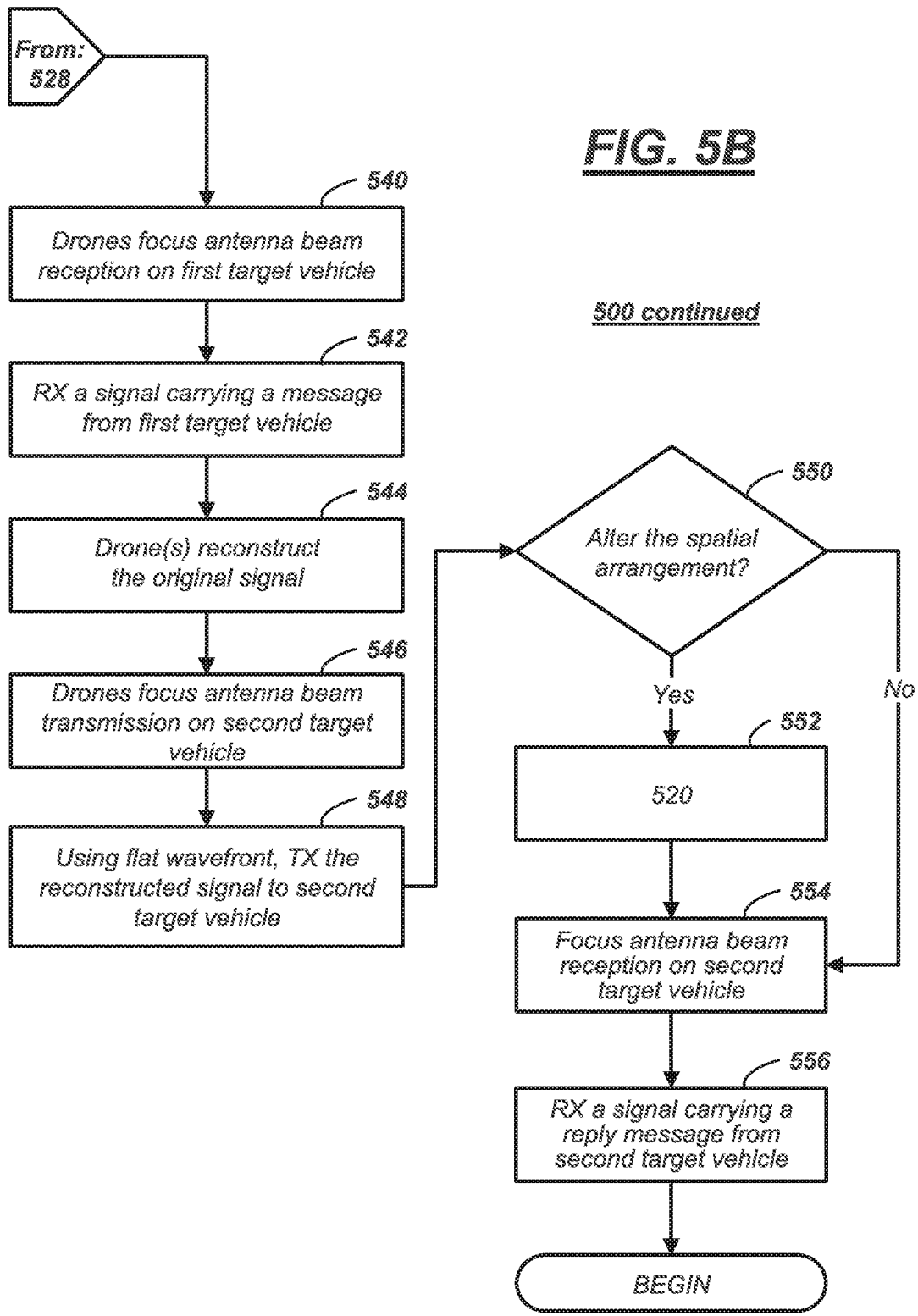

VEHICLE-TO-VEHICLE COMMUNICATION USING DRONES FOCUSING ANTENNA BEAMS

BACKGROUND

Vehicle-to-vehicle (V2V) communication may not always be successful. For example, a vehicle may attempt V2V communication and no recipient may respond—e.g., as any suitable recipient may be out-of-range.

BRIEF DESCRIPTION OF THE DRAWINGS

FIGS. 5A-5B are flow diagrams illustrating a process which may be carried out using the plurality of drones, the first vehicle, and the second vehicle.

DETAILED DESCRIPTION

Figure 1:
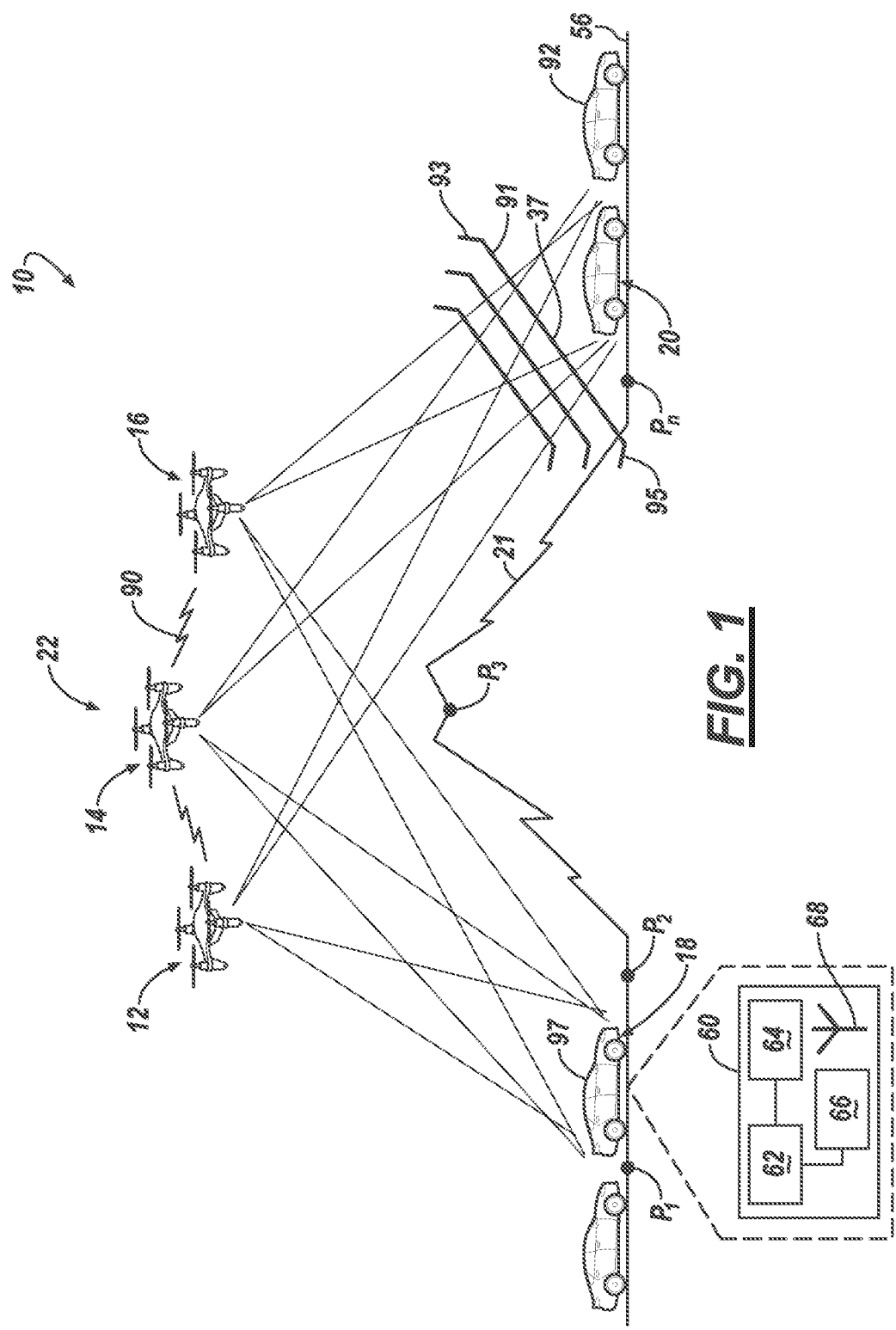
FIG. 1 is a schematic diagram illustrating a plurality of drones assisting in vehicle-to-vehicle communication between a first vehicle and a second vehicle.

A drone communication system is described that includes a plurality of drones which may assist in facilitating vehicle-to-vehicle (V2V) communication. According to one illustrative example, a method can include: when a recipient vehicle is out of wireless range, transmitting a message, from a sending vehicle, to a plurality of drones that are focusing antenna beams on the sending vehicle so that the plurality then may transmit the message to the recipient vehicle by focusing antenna beams thereon.

According to the at least one example set forth above, the focused antenna beams on the recipient vehicle form a conformal wavefront.

According to the at least one example set forth above, the method further may include: receiving, at the sending vehicle, a reply message, from the recipient vehicle, via a plurality of drones that are focusing antenna beams on the sending vehicle.

According to another illustrative example, a method may include: determining, relative to a first vehicle and a second vehicle, a drone configuration of a plurality of drones; receiving, at each of the plurality, a message from the first vehicle; and transmitting, to the second vehicle, the message via a conformal wavefront, the wavefront being based on the configuration and respective-drone phase delays.

According to the at least one example set forth above, determining the configuration is based on minimizing phase delay between the plurality and the first vehicle.

According to the at least one example set forth above, determining the configuration is based on minimizing phase delay between the plurality and the second vehicle.

According to the at least one example set forth above, receiving the message further comprises reconstructing the message using a first set of phase delay parameters, wherein each parameter is associated with one of the plurality and the first vehicle.

According to the at least one example set forth above, receiving further comprises focusing an antenna reception beam of each of the plurality on the first vehicle.

According to the at least one example set forth above, transmitting the message further comprises calculating a second set of phase delay parameters, wherein each parameter is associated with one of the plurality and the second vehicle.

According to the at least one example set forth above, transmitting further comprises focusing an antenna transmission beam of each of the plurality on the second vehicle.

According to the at least one example set forth above, the method further may include: prior to determining the configuration, determining to establish drone-to-drone communication among the plurality.

According to the at least one example set forth above, the method further may include: prior to determining the configuration, determining to assist in vehicle-to-vehicle communication between the first and second vehicles.

According to the at least one example set forth above, the method further may include: maintaining the configuration while receiving and transmitting the message and while the first and second vehicles are moving.

According to the at least one example set forth above, the method further may include: altering the configuration to minimize phase delay between the plurality and the second vehicle prior to receiving, from the second vehicle, a reply message intended for the first vehicle.

According to another illustrative example, a system includes: a plurality of drones each having a processor and memory storing instruction executable by the respective processors, the respective instructions comprising, to: determine, relative to a first vehicle and a second vehicle, a drone configuration of the plurality; receive, at each of the plurality, a message from the first vehicle; and transmit, to the second vehicle, the message via a conformal wavefront, the wavefront being based on the configuration and respective-drone phase delays.

According to the at least one example set forth above, the instructions further may include: to determine the configuration to minimize phase delay between the plurality and the first vehicle, between the plurality and the second vehicle, or both.

According to the at least one example set forth above, the instructions further may include: while receiving, to focus an antenna reception beam of each of the plurality on the first vehicle; and while transmitting, to focus an antenna transmission beam of each of the plurality on the second vehicle.

According to the at least one example set forth above, the instructions further may include: prior to determining the configuration, to determine to establish drone-to-drone communication among the plurality.

According to the at least one example set forth above, the instructions further may include: prior to determining the configuration, to determine to assist in vehicle-to-vehicle communication between the first and second vehicles.

According to the at least one example set forth above, the instructions further may include: alter the configuration to minimize phase delay between the plurality and the second vehicle prior to receiving, from the second vehicle, a reply message intended for the first vehicle.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Now turning to the figures, wherein like numerals indicate like parts throughout the several views, there is shown a drone communication system 10 that includes a plurality of drones 12, 14, 16 which may assist in facilitating vehicle-to-vehicle (V2V) communication. As will be described more below, drones 12-16 each may receive a relatively weak wireless signal from a first target vehicle 18 (e.g., a sending vehicle) by focusing antenna beam reception thereon. The signal may comprise a message for a second target vehicle 20 (e.g., an intended recipient vehicle). However, in at least some examples, the wireless signal sent from vehicle 18 may attenuate before reaching vehicle 20—e.g., based on a distance between the vehicles 18, 20, an obstruction 21, or the like. The drones 12-16 may reconstruct the originally-transmitted signal (from the first vehicle 18) using the respectively-received signals, amplify the reconstructed signal, and then transmit it to vehicle 20—e.g., by focusing their respective antenna beam transmissions thereon. Thus, wireless message communication may be achieved between vehicles 18 and 20 in circumstances in which it might not otherwise be feasible.

As will be explained more below, this assisted vehicle-to-vehicle (V2V) communication may be based on each of the drones 12-16 knowing their relative spacing and orientation with respect to one another (e.g., a drone configuration 22), as well as knowing each of their relative spacing and orientation from the first and second vehicles 18, 20. Furthermore, as will be explained more below, the drones 12-16 may determine an optimal drone configuration, range, and orientation with respect to the vehicles 18, 20.

At least two drones may be used to implement the phase and beam focusing techniques described herein. And while three drones (12-16) are shown, more may be used in other examples. Further, in at least one example, the illustrated drones 12-16 may be identical; therefore, only one will be described herein for purposes of illustration.

Figure 2:
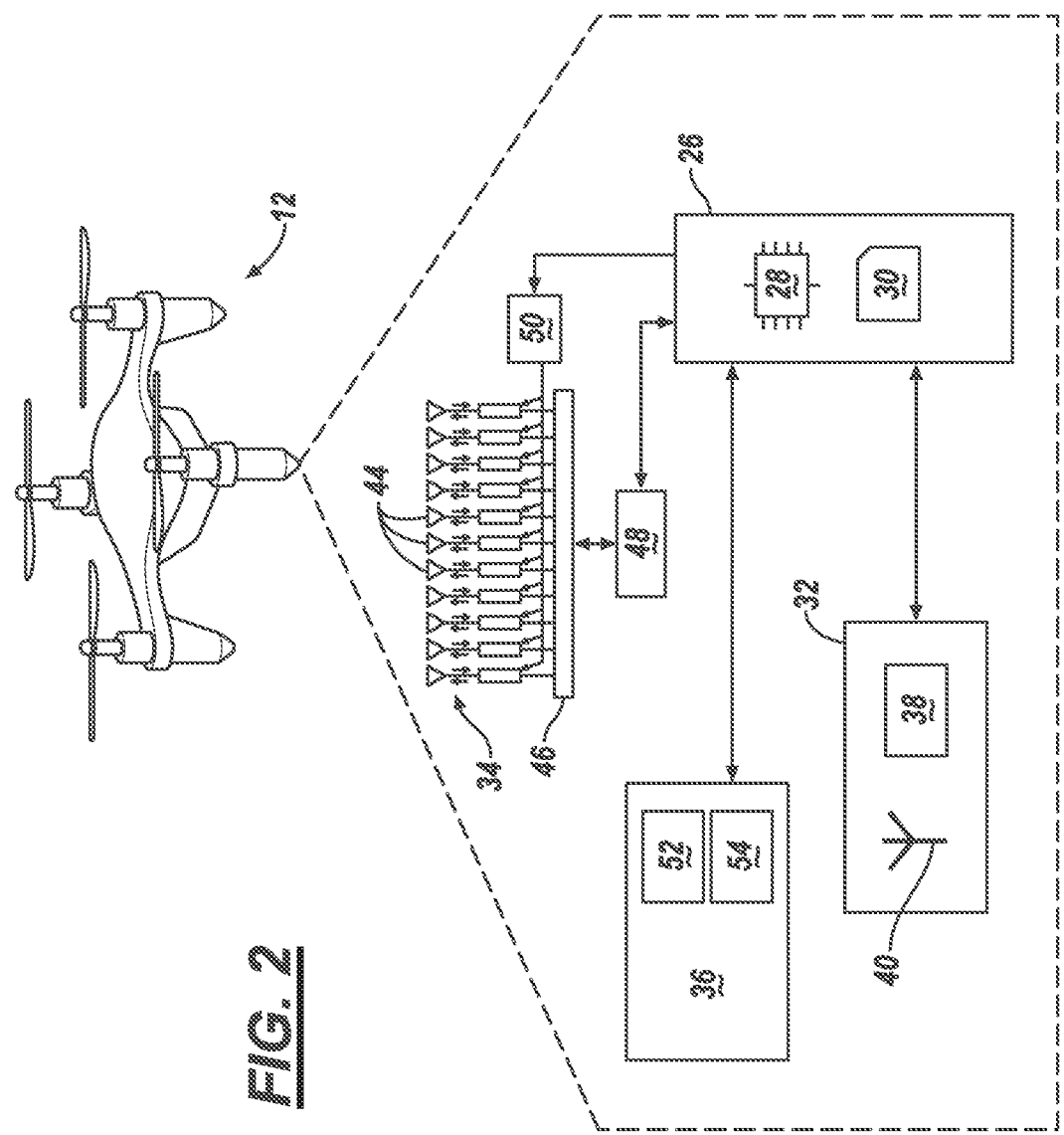
FIG. 2 is a schematic diagram of one of the plurality of drones.

As shown in FIG. 2, drone 12 may be any aerial vehicle which may be operated and controlled at least partially, if not entirely, by at least one computer 26 onboard the drone 12 itself. Non-limiting examples of drones include an unmanned aerial vehicle (UAV), an unmanned aircraft system (UAS), etc. Autonomous operation of the drone 12 may include, among other things, drone flight control, drone steering, drone stabilization, drone navigation, drone-to-drone communication, drone-position determination, vehicle-position determination, and drone antenna control (e.g., beamforming, beamsteering, amplification, etc.). Techniques for autonomous flight control, steering, stabilization, and navigation are known in the art and will not be discussed in detail below.

To improve V2V communication, drone 12 may comprise the computer 26 (which includes at least one processor 28 coupled to memory 30), a telematics device 32, an antenna circuit 34, and a sensor system 36. Computer 26 may be a single computer (or multiple computing devices—e.g., shared with other drone systems and/or subsystems). Processor 28 can be any type of device capable of processing electronic instructions, non-limiting examples including a microprocessor, a microcontroller or controller, an application specific integrated circuit (ASIC), etc.—just to name a few. In general, computer 26 may be programmed to execute digitally-stored instructions, which may be stored in memory 30, which enable the computer 26, among other things: to determine, among a plurality of drones 12-16, to relay a message from first vehicle 18 to second vehicle 20; to determine a configuration 22 of drones suitable for receiving and reconstructing a signal carrying the message (e.g., based on phase delays); to focus antenna reception of each of the plurality of drones 12-16 on the first vehicle 18 to receive the message; to determine a drone configuration 22, again using phase delay parameters, that is also suitable for transmitting the message within a signal having a conformal wavefront 37 (e.g., the wavefront 37 may have a leading edge that is flat) toward the second vehicle 20; and to focus antenna transmission of each of the plurality of drones 12-16 on the second vehicle 20 to send the message thereto.

Telematics device 32 may be any suitable telecommunication device configured to wirelessly communicate with other electronic devices—namely, wirelessly communicate with target vehicles such as vehicles 18, 20. Device 32 may comprise a dedicated microprocessor (not shown), at least one wireless chipset 38, and matched antenna 40 coupled to the chipset 38. The chipset 38 may facilitate wireless communication according to predetermined frequencies, symbol rates, etc. Using chipset 38 and antenna 40, telematics device 32 may communicate via cellular communication (e.g., GSM, CDMA, LTE, etc.), via medium-range wireless communication (e.g., Dedicated Short-Range Communication (DSRC)), via short-range wireless communication (e.g., Bluetooth, Wi-Fi, Wi-Fi Direct, etc.), a combination thereof, or the like. In at least one example, device 32 communicates via a different frequency and/or protocol than do the vehicles 18, 20 when attempting vehicle-to-vehicle communication. One example includes communication via a short-range wireless communication link using a protocol such as Wi-Fi Direct, Bluetooth, or other suitable peer-to-peer communication. In this manner, inter-drone communication may be less likely to interfere with vehicle-to-drone (or drone-to-vehicle) communication, as will be explained in greater detail below.

The antenna circuit 34 may be used to relay communication between vehicles 18, 20—e.g., to receive a message from vehicle 18 and then transmit the message to vehicle 20. In general, the circuit 34 may comprise any suitable directional antenna. In the illustration (FIG. 2), the circuit 34 comprises a phased-array antenna implementation; however, this is merely one example. For example, the phased-array antenna implementation may comprise a plurality of antenna elements 44 coupled to a power source 46 (which may divide power between the antennas 44), a transceiver 48 (coupled to the source 46 and computer 26), and a phase-shift driver 50 coupled to each of the antennas (and also computer 26). In operation, the computer 26 may control selectively the actuation of one or more antennas 44 using driver 50. In this manner, the antenna circuit 34 may control the directionality of one or more of the antennas 44 using phase-control techniques known to those skilled in the art. Further, computer 26 selectively may switch antennas 44 between a receive mode and a transmit mode by controlling transceiver 48.

As will be discussed more below, the computer 26 may operate an antenna reception beam (e.g., to receive a message from first vehicle 18) and switch relatively quickly to an antenna transmission beam (e.g., to send the message to the second vehicle 20). This switching may comprise not only changing the transceiver 48 from the receive mode to the transmit mode, but also changing the directionality of the antennas 44 (e.g., from the first vehicle 18 to the second vehicle 20). According to at least one example (e.g., such as the phased-array example), beamsteering (or so-called beamshifting) from the first vehicle 18 to the second vehicle 20 may occur within ¼-wavelength of one another. In this manner, transmission lag experienced at the recipient vehicle (e.g., vehicle 20) may be minimized Other aspects and techniques of phased-array antenna actuation will be appreciated by those skilled in the art. As will be explained more below, when multiple drones (e.g., 12-16) control the directionality of antenna reception or antenna transmission on a common object (e.g., such as vehicle 18 or 20), then the drones 12-16 may focus their respective antenna beams thereon resulting in longer transmission ranges and a higher signal-to-noise ratio (e.g., either received or transmitted); in this manner, the drones 12-16 may facilitate V2V where it otherwise may be difficult or impossible (e.g., including around obstructions 21, over extended ranges, etc.).

Antenna circuit 34 may be adapted to receive and/or transmit wireless signals of any suitable frequency and according to any suitable protocol. Thus, circuit 34 may be configured to operate in a MegaHertz (MHz) band, a GigaHertz (GHz) band, a TeraHertz (THz) band, or an Ultra-Wide Band (UWB), just to name a few non-limiting examples. Non-limiting examples of protocols include Wi-Fi, Bluetooth, DSRC, cellular, and the like. According to at least one example, the antenna circuit 34 is configured for DSRC communication—e.g., more particularly, to participate in intelligent transportation system (ITS) communication. In some commercial implementations, DSRC utilizes the 5.9 GHz band (e.g., United States and Europe), 5.8 GHz band (e.g., Japan), infrared, etc.; of course, other examples exist. In this manner, drones 12-16 (e.g., via their respective antenna circuits 34) may receive a DSRC communication message sent from vehicle 18 and which is intended for vehicle 20, particularly when vehicle 20 is out-of-range of vehicle 18.

Sensor system 36 onboard drone 12 may comprise a positioning device 52 and one or more other optional position-determining units 54. According to one example, positioning device 52 is a radio detection and ranging (RADAR) device—i.e., an object-detection device that can use radio waves to determine: a range of vehicle 18 (and/or 20) from device 52, a range of a reference point (e.g., P1, P2, P3, . . . Pn) on the ground 56, an angle or orientation of the vehicle 18 (and/or 20) from device 52, and/or a speed or velocity of vehicle 18 (and/or 20) with respect to device 52. The positioning device 52 may comprise one or more directional or omni-directional antennas so that the drone 12 may determine a three-dimensional location or position of objects around it. Positioning devices other than radar are also possible—e.g., including device 52 being a GPS device, a light detection and ranging (LIDAR) device, or the like.

In at least one example, the sensor system 36 comprises a radar device 52 and at least one position-determining unit 54. Non-limiting examples of units 54 include an electronics device which can determine position using a Global Positioning System (GPS) or a Global Navigation Satellite System (GLONASS), an electronics device which uses LIDAR, an electronics device which uses determines position (or relative position) using triangulation, received signal strength, angle of arrival, time of flight, differential time of flight, a combination thereof, etc. Thus, drone 12 may use radar device 52 and unit 54 to more accurately determine relative position of other drones, the ground 56, vehicles 18, 20, etc.

Turning now to vehicles 18, 20, in at least one example, vehicles 18, 20 are identical. Therefore, only one will be explained in detail. Vehicle 18 is shown as a passenger car; however, vehicle 18 could also be a truck, sports utility vehicle (SUV), recreational vehicle, bus, train, marine vessel, or the like that communicates using the drone communication system 10.

Vehicle 18 comprises, among other things, one or more computers 60 that facilitate vehicle-to-vehicle (V2V) communication. According to one example, computer 60 comprises a telematics device similar to device 32 (of drones 12-16); however, this is not required (e.g., while computer 60 may execute one or more telecommunication services for vehicle 18, it also could carry out other vehicle instructions as well). According to one example, computer 60 may comprise a processor 62, memory 64, a wireless chipset 66, and a matched antenna 68. Processor 62 can be any type of device capable of processing electronic instructions, non-limiting examples including a microprocessor, a microcontroller or controller, an application specific integrated circuit (ASIC), etc.—just to name a few. In general, computer 60 may be programmed to execute digitally-stored instructions, which may be stored in memory 64, which enable the computer 60, among other things: to receive and/or transmit wireless communication using a common protocol, channel, etc. as the vehicle 20 and drones 12-16; to attempt to transmit, via chipset 66 and antenna 68, a message to another vehicle (e.g., such as vehicle 20); to determine that the message failed (e.g., by not receiving an acknowledge (ACK) message from vehicle 20; based on the failed communication, to identify a plurality of drones (e.g., such as drones 12-16) which may assist in V2V communication; and to transmit the message again, via chipset 66 and antenna 68, so that the drones 12-16 may then transmit the message to the recipient vehicle (e.g., 20) by focusing antenna transmission beams thereon and by providing the transmission (from multiple drones 12-16) as a conformal wavefront 37. These instructions are merely one example; other examples are possible, including to receive at vehicle 18, via chipset 66 and antenna 68, a reply message from vehicle 20 via the plurality of drones 12-16 (e.g., as a result of the drones 12-16 focusing antenna transmission beams on vehicle 20).

Memory 64 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 64 may store one or more computer program products which may be embodied as software, firmware, or the like.

As wireless chipset 66 and matched antenna 68 may be identical to chipset 38 and antenna 40, these elements will not be described in greater detail here. In at least one example, chipset 66 and antenna 68 are configured for DSRC; however, other communication protocols and frequencies may be used. Further, it should be appreciated that in at least some examples, the vehicle 18 may have a number of distributed antennas 68. Further, in at least one example, antenna(s) 68 are omni- or bi-directional, and typically is not steerable or focus-able.

Figure 3:
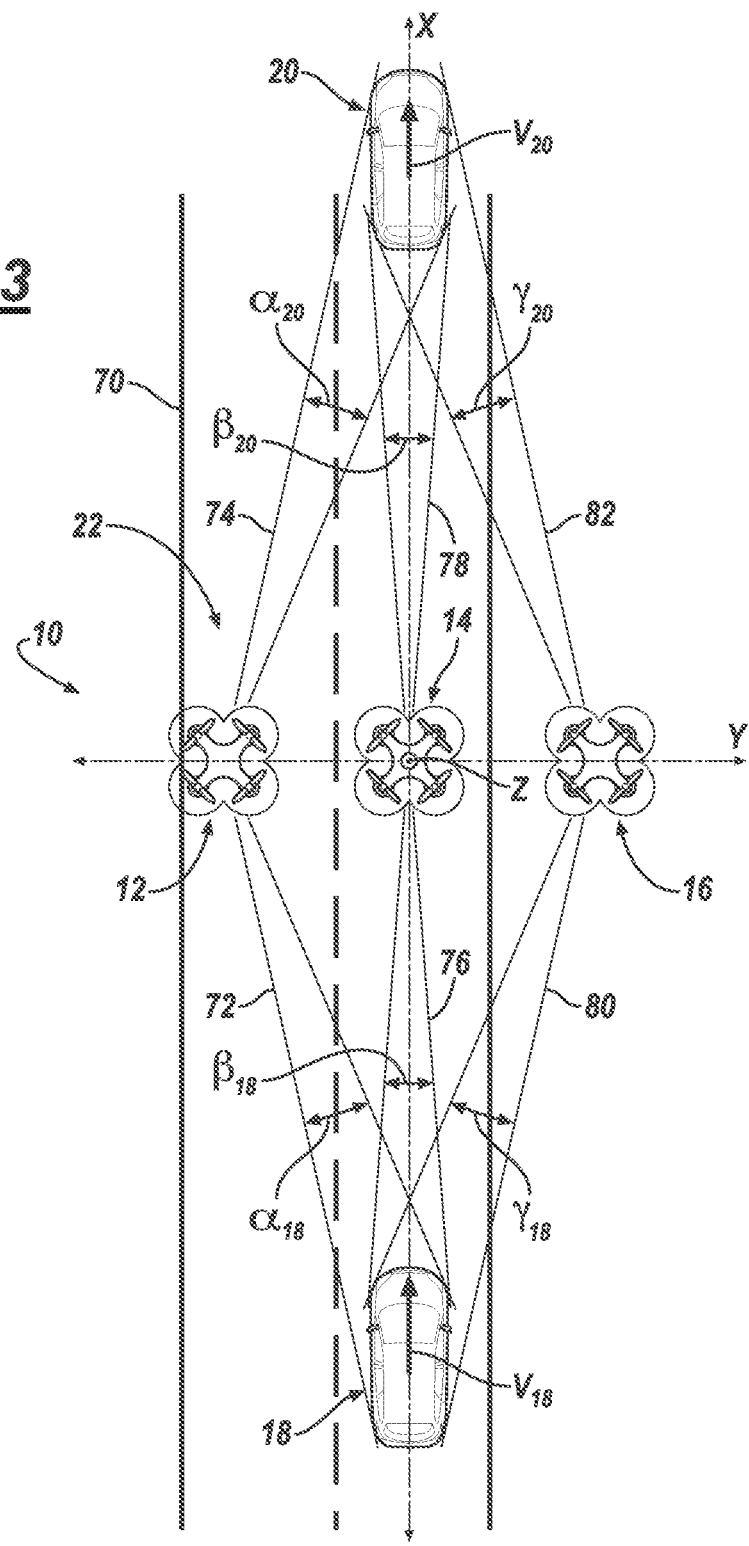
FIG. 3 is a schematic view of a drone configuration of the plurality of drones with respect to the first and second vehicles, wherein the plurality of drones is shown focusing antenna reception beams on the first vehicle and is shown focusing antenna transmission beams on the second vehicle.
Figure 4:
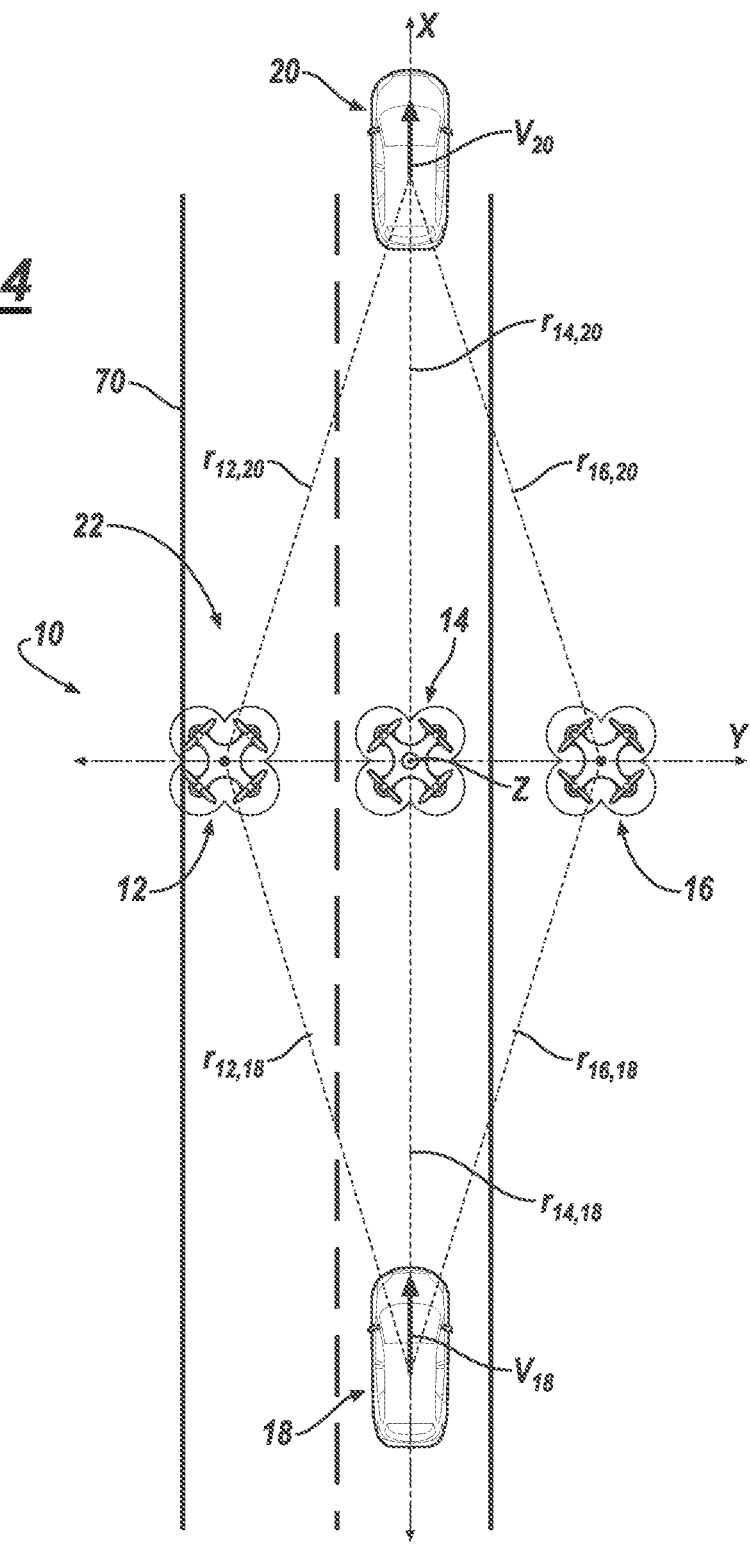
FIG. 4 is another schematic view of the drone configuration shown in FIG. 3.

FIGS. 3 and 4 illustrate simplified examples of a drone configuration 22 of drones 12-16. This diagram is intended merely for explanatory purposes and not to be limiting (e.g., in particular, different configurations of the drone configuration will produce beams with different characteristics, but generally the drone configuration is arbitrary). In the figures, vehicles 18, 20 are traveling along a roadway 70 at velocities $v_{18}$ and $v_{20}$, respectively. Here, the vehicles 18, 20 are moving in a common direction; however, this is not required. As will be described more below, when vehicle 18 transmits a message intended for vehicle 20 (e.g., according to DSRC), vehicle 20 may be spaced far enough from vehicle 18 that it is out-of-wireless-range. Or for example, a natural or artificial obstruction, such as obstruction 21 shown in FIG. 1, may result in the message failing to reach vehicle 20 (or it may have such degraded strength and/or quality that vehicle 20 does not resolve the message from signal noise). Non-limiting examples of obstructions include mountains, roadway curvatures, buildings, tunnels, a combination thereof, etc.

Drones 12-16 may assist in the V2V communication by already being in (or by moving into) configuration 22. FIG. 3 illustrates configuration 22 of drones 12-16 as being spaced from one another along a Y-axis (wherein vehicles 18, 20 are spaced along an X-axis, and drone 14—which is positioned between drones 12, 16—being located along a Z-axis (e.g., vertical with respect to ground 56)). As will be discussed more below, at the time of V2V communication assistance between vehicles 18, 20, there may be a desirable (e.g., or even optimal) configuration 22 which may minimize phase delays between each vehicle 18, 20 and the drones 12-16. Of course, since the vehicles 18, 20 may be moving (and may have different velocities), since the surrounding terrain (and potential obstructions 21) may be changing (relative to the vehicles 18, 20), and since the shape, direction, and/or inclination of the roadway 70 may be changing, an optimal configuration of drones 12-16 also may be changing. Thus, FIGS. 3-4 illustrate only one example.

FIG. 3 also illustrates beam focusing between each of drones 12-16 and each respective vehicle 18, 20. Drone 12 may focus an antenna beam 72 having an angle of divergence $\alpha_{18}$ toward vehicle 18 and/or may focus an antenna beam 74 having an angle of divergence $\alpha_{20}$ toward vehicle 20; depending on the mode of the respective transceiver 48, either of beams 72, 74 may be antenna reception or antenna transmission beams. Drone 14 may focus an antenna beam 76 having an angle of divergence $\beta_{18}$ toward vehicle 18 and may focus an antenna beam 78 having an angle of divergence $\beta_{20}$ toward vehicle 20; again, depending on the mode of the respective transceiver 48, either of beams 76, 78 may be antenna reception or antenna transmission beams. And drone 16 may focus an antenna beam 80 having an angle of divergence $\gamma_{18}$ toward vehicle 18 and may focus an antenna beam 82 having an angle of divergence $\gamma_{20}$ toward vehicle 20; and again, depending on the mode of the respective transceiver 48, either of beams 80, 82 may be antenna reception or antenna transmission beams. Angles $\alpha_{18}$, $\alpha_{20}$, $\beta_{18}$, $\beta_{20}$, $\gamma_{18}$, and $\gamma_{20}$ may be the same quantity and/or differ. In at least one example, each of drones 12-16 determine and tailor the shape of the respective beam based on the respective and relative line-of-sight (LOS) ranges $r_{12,18}$, $r_{12,20}$, $r_{14,18}$, $r_{14,20}$, $r_{16,18}$, and $r_{16,20}$ (FIG. 4), as will be explained in greater detail below. FIG. 4 illustrates a diagram similar to FIG. 3, except that the beams 72-82 are hidden and ranges $r_{12,18}$, $r_{12,20}$, $r_{14,18}$, $r_{14,20}$, $r_{16,18}$, and $r_{16,20}$ are shown instead.

Figure 5A:
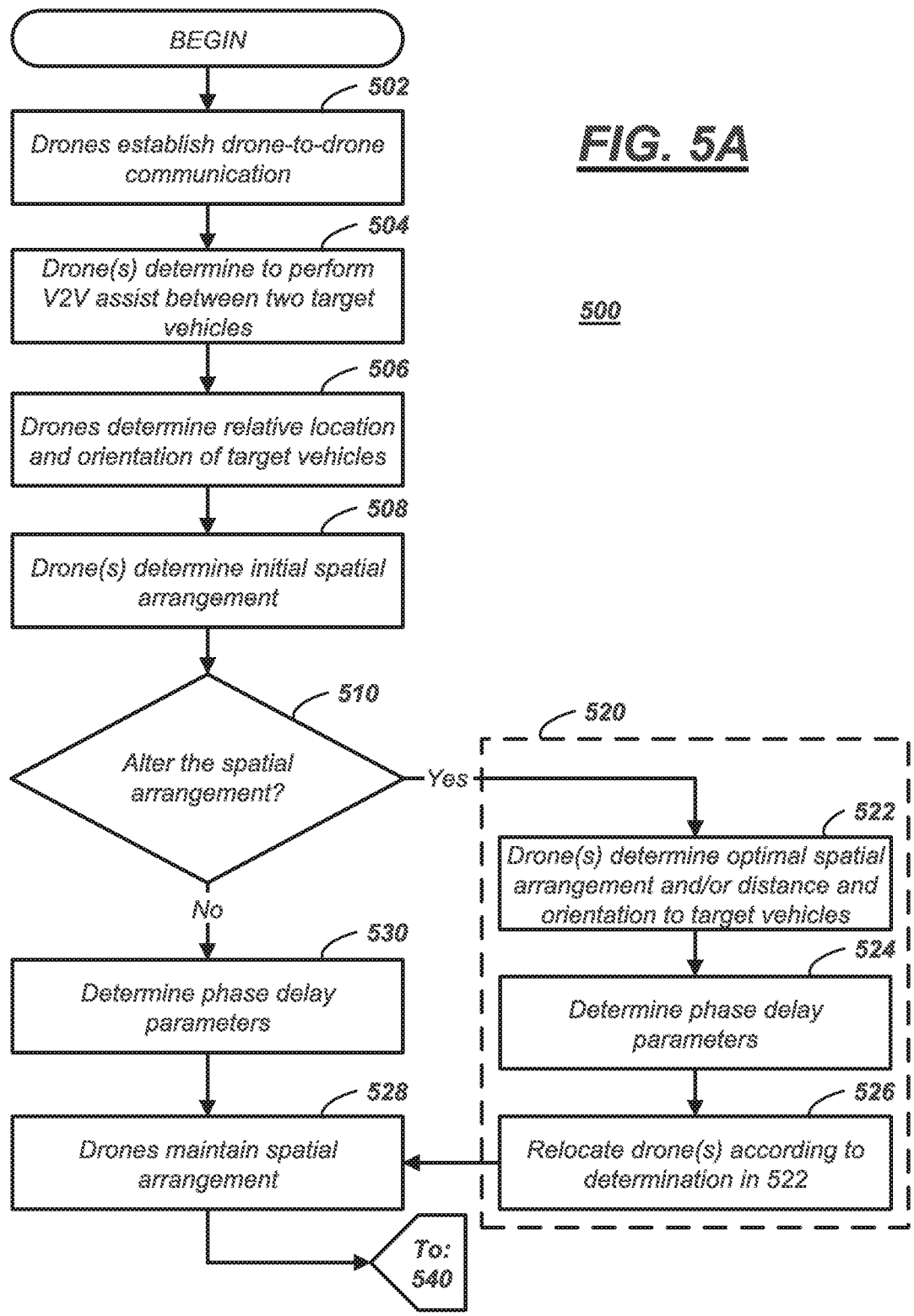

Turning now to FIGS. 5A-5B, a process 500 is shown, portions of which may be executed using the drone communication system 10 or one of the vehicles 18, 20. The process begins with block 502 wherein the drones 12-16, using respective computers 26, establish drone-to-drone communication (e.g., establish a wireless drone communication network 90). At least some of the instructions described below may be executed by one or more of drones 12-16—e.g., using respective computers 26. For example, a single drone (e.g., drone 12) may execute the instructions by controlling the remaining drones (e.g., as in a master-slave relationship); or each drone 12-16 may be programmed to execute at least some of the instructions—e.g., by operating according to a predetermined set of protocols and priorities, wherein no single drone controls the remaining drones. These are merely two drone-operation examples; others exist.

According to one example of block 502, drones 12-16, using their respective telematics devices 32 establish communication via cellular, Bluetooth, Wi-Fi, Wi-Fi Direct, or other suitable short, medium, or long-range wireless communication. In at least one example, the drones 12-16 establish communication via a peer-to-peer protocol such as Bluetooth. Again, as discussed above, more or fewer than three drones may be used. Further, additional drones may be added to or removed ad hoc from the network 90—e.g., as available drones come into proximity (or leave proximity) of a cluster of networked drones assisting in the facilitation of V2V communication.

Block 504 may follow. Here, drones 12-16, using respective computers 26, may determine to perform a V2V assist between two target vehicles (e.g., vehicles 18, 20). This determination may arise in any suitable manner According to one example, drones 12-16 are operating in a listen mode—e.g., not interacting with vehicles 18, 20 until requested. For example, vehicle 18 may transmit (via chipset 66) a message intended for vehicle 20—and e.g., vehicle 18 may infer a failure based on not receiving an acknowledge (ACK) message from vehicle 20. Based on this inferred failure, vehicle 18 may communicate with the drone network 90 via DSRC—e.g., requesting a V2V assist.

Other examples of block 504 exist. For example, one or more of drones 12-16 may determine that vehicles 18, 20 are attempting unsuccessfully to communicate and may intercede. Still other examples exist as well.

In block 506 which follows, according to one example, each of drones 12-16 may determine its relative location and orientation with respect to each of target vehicles 18, 20. For example, each respective computer 26 may utilize its onboard sensor system 36 (e.g., RADAR, GPS, and/or the like) to determine relative position and orientation parameters. According to one example, each drone 12-16 identifies its current position and corresponding locations of the target vehicles 18, 20 (e.g., relative thereto). In some instances, each drone also may identify this location and orientation data using a point of reference (e.g., such as P1, P2, P3, ..., Pn) on the ground 56—e.g., so the drones 12-16 may have a common frame of reference. In this case, each of the drones 12-16 may utilize the same one or more current points of reference; it will be appreciated that during V2V communication assistance—since the vehicles 18, 20 (and drones 12-16) may be moving—the point(s) of reference may change from time to time.

In at least one example, block 508 occurs at least partially concurrently with block 506. In block 508, the respective computers 26 of drones 12-16 may determine an initial drone configuration 22 of the drones. As used herein, a drone configuration defines the relative location of one drone in the drone communication network 90 with respect to at least one other drone that is the drone communication network 90, and when the drones are in the configuration 22, each of the drones move together as a unit thereby maintaining their relative positions and orientations with respect to one another (e.g., within a predetermined tolerance). Thus, in block 508, drone(s) 12-16 may determine their current configuration 22 (e.g., at the time of block 504—when the drones 12-16 determined to assist in V2V). In at least one example, network 90 is a short range wireless communication network (e.g., such as Bluetooth), and a size of the configuration 22 is limited by relative positions of the drones 12-16 and respective Bluetooth attenuation ranges therebetween.

In block 510 which follows, at least one of the respective computers 26 of drones 12-16 may determine to alter the configuration 22. If the drone(s) 12-16 determine to alter or reconfigure the configuration 22, then process 500 proceeds to block 520. If the drones determine otherwise, the process proceeds to block 530.

Block 520 may comprise blocks 522, 524, and 526; it should be appreciated that block 520 may be iterated repeatedly to compensate for drift between drones due to wind, weather, etc. Thus, process 500 may proceed from block 510 to block 522. In block 522, the respective computer(s) 26 of drones 12-16 may determine an optimal or more desirable configuration. In at least one example, the more desirable drone configuration balances and/or minimizes communication delays between the drones 12-16 and the respective vehicle 18 (or 20). The more desirable configuration 22 also may facilitate the formation of a conformal wavefront 37—e.g., when drones 12-16 relay the wireless signal from vehicle 18 to vehicle 20, as described below. For example, the vehicle 18 may have an omni-directional transmitter (e.g., having a curved wavefront). When the drones 12-16 are in a receive mode, the drone configuration 22 forms a spatial filter tuned with an a-priori assumption about the wavefront curvature. According to one example, this assumption may be that the conformal wavefront 37 is flat; however, this is merely an example. Other conformal shapes are also possible. (Similarly, the wavefront from the drones 12-16 in a transmit mode (e.g., toward vehicle 20) may be curved to conform with the antenna of vehicle 20 which may be spherical in nature; however, conformal wavefront 37 in the transmit mode may be flat as well (e.g., for sake of simplicity).

As used herein, a conformal wavefront 37 is a wavefront in the receive or transmit mode that conforms to the shape of the respective transmitting or receiving vehicle antenna. According to one example, the conformal wavefront 37 may comprise a middle portion 91 that is flat and may have outer regions 93, 95 (which extend outwardly from the middle portion 91) which are not. The middle portion 91 may be at least as large as a cabin 97 of vehicle 18 or 20. For example, to form a flat wavefront, the position and orientation concur of drones 12-16 need to share a common axis and direction along that axis; e.g., using the figures to illustrate, at least some component of the transmissions of drones 12-16 (to vehicle 20, described below) may be along the positive X-axis, although components along the Y- and Z-axes may differ. Other aspects of forming the conformal wavefront 37 utilize phase delay parameters (e.g., $\tau_{12,20}$, $\tau_{14,20}$, $\tau_{16,20}$), which are described below.

In yet another example, determining the more desirable configuration 22 may include determining to relocate one or more of drones 12-16 within a wireless range of vehicles 18, 20. To illustrate, consider, e.g., a straight stretch of roadway 70 (e.g., shown in the simplified example of FIGS. 3-4); if drone 12 was substantially farther from drone 14 than was drone 16 (e.g., if $r_{12,18} \gg r_{16,18}$ and $r_{12,20} \gg r_{16,20}$), then a more desirable drone configuration may be to move drone 12 closer to drones 14, 16 (e.g., so that $r_{12,18} \approx r_{16,18}$ and $r_{12,20} \approx r_{16,20}$). In this simplified example, this could place drone 12 within wireless range of vehicles 18 and 20 and also may minimize phase delay between drone 12 and vehicle 18, as well as drone 12 and vehicle 20.

As used herein, a phase delay refers to a differential time delay in wireless transmission between a vehicle and at least two drones, and as used herein, a phase delay parameter refers to a value of such a differential time delay. For example, if vehicle 18 transmits a DSRC signal, it may be received by each of drones 12, 14, and 16 at different times; e.g., if ranges $r_{12,18}$, $r_{16,18}$ to drones 12, 16 are longer than the range $r_{14,18}$ to drone 14, then a phase delay parameter ($\tau_{14,18}$) associated with vehicle 18 and drone 14 may be zero, but phase delay parameters ($\tau_{12,18}$, $\tau_{16,18}$) of drones 12, 16 (with respect to vehicle 18) may be greater than zero. Of course, phase delay parameter $\tau_{12,18}$ of drone 12 could also differ from phase delay parameter $\tau_{16,18}$ of drone 16 as well. Similarly, if each of the drones 12, 14, 16 simultaneously transmitted a signal to vehicle 20, the signal could be received at three different times at vehicle 20 due to phase delays (e.g., values $\tau_{12,20}$, $\tau_{14,20}$, $\tau_{16,20}$ of could differ). Thus, in block 520, the computer(s) 26 of drones 12-16 may determine a new configuration 22 based, at least in part, on minimizing overall phase delays (e.g., $\tau_{12,18}$, $\tau_{14,18}$, $\tau_{16,18}$, $\tau_{12,20}$, $\tau_{14,20}$, $\tau_{16,20}$) within the drone network 90.

In block 524—which may occur at least partially concurrently with block 522, the computer(s) 26 of the drones 12-16 may determine a first set of phase delay parameters (e.g., $\tau_{12,18}$, $\tau_{14,18}$, $\tau_{16,18}$) (e.g., in this case, pertaining to reception) and a second set of phase delay parameters (e.g., $\tau_{12,20}$, $\tau_{14,20}$, $\tau_{16,20}$) (e.g., in this case, pertaining to transmission). The first set of phase delay parameters may be associated with the relative positions and/or orientations of the drones 12-16 with respect to vehicle 18. And the second set of phase delay parameters may be associated with the relative positions and/or orientations of the drones 12-16 with respect to vehicle 20. As used herein, a first set (or a second set) of phase delay parameters is two or more phase delay values, one for each drone in the arrangement 22. As exemplified above, a phase delay value of at least one of the drones may equal zero (0); however, this is not required. According to at least one non-limiting example, it may be desirable that the largest value of a phase delay parameter in a set is not more than ten times larger than a smaller value of a different phase delay parameter in the respective set; however, this is merely one example and others exist.

In block 526, one or more of the drones 12-16 may move and relocate according to the newly determined drone configuration 22 (e.g., in accordance with the determination in block 522). It should be appreciated that the configuration 22 determined in block 522 may be temporal—e.g., as circumstances may be changing repeatedly based on changing speed and/or direction of the vehicles 18, 20, based on terrain changes, based on different obstructions, etc.

In at least one example of block 520, the configuration 22 of drones 12-16 (of block 526) may change drone positions and/or orientations with respect to one or both of vehicles 18, 20. For example, the configuration 22 may move as a single unit with respect to vehicle 18, vehicle 20, or both. Following block 526, process 500 may proceed to block 528.

In block 528, the drones 12-16 may maintain, at least temporarily, this configuration 22. For example, the drones 12-16 may maintain the configuration 22 at least until the drones 12-16 receive a wireless signal from vehicle 18 (e.g., comprising a message intended for vehicle 20). This configuration 22 further may be maintained until the message is transmitted from drones 12-16 to vehicle 20, as described in the blocks discussed below. Following block 528, process 500 may proceed to block 540.

Returning to block 530 (which may follow block 510 when the drone(s) 12-16 determine not to alter the initial configuration 22 determined in block 508), in block 530, one or more drones 12-16 may determine a respective first set of phase delay parameters (e.g., $\tau_{12,18}$, $\tau_{14,18}$, $\tau_{16,18}$) and a respective second set of phase delay parameters (e.g., $\tau_{12,20}$, $\tau_{14,20}$, $\tau_{16,20}$). This instruction, executed by computer(s) 26, may be identical or similar to block 524 (except that it pertains to different ranges $r_{12,18}$, $r_{12,20}$, $r_{14,18}$, $r_{14,20}$, $r_{16,18}$, and $r_{16,20}$); therefore, it will not be described in greater detail. Block 528 (maintaining the configuration 22—in this case, the initial configuration determined in block 508) may follow block 530. And again, following block 530, the process proceeds to block 540.

In block 540, the drones 12-16 each may focus an antenna reception beam at the first target vehicle 18. In the example that follows, the antennas 44 are described as a phased-antenna array; however, this is for example purposes only and is not intended to be limiting. For example, each respective computer 26 of drones 12-16 may place transceiver 48 in the receive mode, and focus the phased-array of antennas 44 may be directed toward vehicle 18. The focus of the antennas 44 may control the angles of divergence ($\alpha_{18}$, $\beta_{18}$, $\gamma_{18}$) of the respective phased-array antennas of drones 12-16. For example, FIG. 3 (discussed above) illustrates that the focus of each beam 72, 76, 80 may differ based on the position and orientation of the respective drone (12, 14, 16) with respect to vehicle 18.

In block 542, via the focused beams 72, 76, 80, each of drones 12-16 may receive a wireless signal carrying a message from vehicle 18 (and intended for vehicle 20). As the ranges $r_{12,18}$, $r_{14,18}$, $r_{16,18}$ may differ, these wireless signals may be received at different times. Further, in at least some examples, one or more of the respectively-received wireless signals may be relatively weak; e.g., SNR may be 10-15 decibels (dB).

In block 544, drone(s) 12-16 may reconstruct the original wireless signal transmitted from computer 60 of vehicle 18. According to one example, drone(s) 12-16, via respective computer(s) 26, may compare the actual phase delay parameters to the calculated parameters (e.g., of block 522), and provided the calculated and actual values are within a predetermined tolerance, the drone(s) 12-16 determine the reception of the message successful. Regardless of whether computer(s) 26 execute a comparison instruction, in block 544, using the phase delay parameters $\tau_{12,18}$, $\tau_{14,18}$, $\tau_{16,18}$, computer(s) 26 may correlate the received wireless signals, combine the signals, and reconstruct the original transmission from vehicle 18.

In block 546, drones 12-16 may switch the transceiver 48 of their respective antenna circuits 34 to the transmit mode and also steer their respective phased-array antennas 44 toward the second target vehicle 20. Similar to the discussion above, focus of the antennas 44 may control the angles of divergence ($\alpha_{20}$, $\beta_{20}$, $\gamma_{20}$) of the respective phased-array antennas of drones 12-16. For example, FIG. 3 (discussed above) illustrates that the focus of each beam 74, 78, 82 may differ based on the position and orientation of the respective drone (12, 14, 16) with respect to vehicle 20. Block 546 may include non-time domain multiplexing examples as well. For instance, each of drones 12-16 may comprise multiple antennas or single antennas which are partitioned. And using multiple antennas or, e.g., two half-duplex channels, the configuration 22 may communicate bi-directionally (e.g., rather than requiring switching between transmit and receive modes).

In block 548 which follows, computers 26 of the respective drones 12-16 may transmit the reconstructed signal (of block 544) to the respective computer 60 of vehicle 20. According to one example, the drone which has the farthest range may transmit first, followed by each successively closer drone, according to their respective, calculated phase delay parameters (e.g., smallest to largest). Using the figures to illustrate, the range $r_{14,20}$ of drone 14 may be smallest and range $r_{16,20}$ of drone 16 may be the largest. In such an example, phase delay parameter $\tau_{16,20}$ may be zero (0), phase delay parameter $\tau_{12,20}$ may be greater than phase delay parameter $\tau_{16,20}$, and phase delay parameter $\tau_{14,20}$ may be greater than phase delay parameter $\tau_{12,20}$. Thus, in operation, drone 16 may initiate transmission of the reconstructed wireless signal (at a time (t)=0), drone 12 may transmit the reconstructed signal at a time (t=$\tau_{12,20}$) later, and then drone 14 may transmit the reconstructed signal last (at a time (t=$\tau_{14,20}$) later), in accordance with the configuration 22 set forth above. In this manner, the middle portion 91 of the wavefronts 37 (e.g., aimed at and received by vehicle 20) may be flat, and the focused signal may be resolvable by the computer 60—e.g., even though the distance between drones 12-16 and vehicle 20 may be larger than the typical wireless range using the protocol. And when these individual wireless drone signals are received as conformal wavefronts 37 (e.g., constructively interfering), vehicle 20 may perceive these multiple signals as a single wireless signal or transmission.

It should be appreciated that if drone transmissions were not synchronized in this manner, a concave or convex wavefront could be received at vehicle 20. For example, concave wavefronts could result from drones 12, 14, 16 transmitting simultaneously (e.g., not according to the phase delay parameters discussed in the example above). Or for example, a convex wavefronts could result from drone 14 transmission lagging transmission by drones 12, 16. Regardless of the shape, vehicle 20 may be unable to resolve non-flat wavefronts or other unfocused transmissions, as signal strength and/or quality may be too degraded. Further, in some instances, instead of constructive interference, the wireless signals even may combine destructively.

Using beamsteering of the respective antennas 44 of drones 12-16 and constructing conformal wavefronts 37 using phase delay techniques, only the intended recipient may receive the signal. For example, roadway 70 may have numerous other vehicles which could intercept the wireless signals (e.g., such as vehicle 92 in FIG. 1). Using the aforementioned instructions, computer(s) 26 may increase communication security by minimizing recipients which receive the transmitted signal, circumvent potential eavesdroppers, and the like. In some examples, only the intended recipient (e.g., vehicle 20) may receive the wireless signals.

Thus, vehicle 20 (via chipset 66 and antenna 68) may receive the message sent from vehicle 18, even though direct vehicle-to-vehicle communication was not feasible or was unsuccessful. Furthermore, using phase delay techniques, wireless range may be extended. According to a non-limiting example, maximum DSRC range may be approximately 300 meters; however, using the focused antenna beams 74, 78, 82 and by forming conformal wavefronts 37, the transmission may be extended up to 20 kilometers. In response to receiving the reconstructed signal, as described more below, vehicle 20 may send a reply message.

Following block 548, process 500 may proceed to block 550 (e.g., determining again whether to alter the configuration 22). Block 550 may be similar or identical to block 510; thus, it will not be described in detail. However, it should be appreciated that the vehicles 18, 20 may be moving at velocities $v_{18}$ and $v_{20}$, respectively. In some examples, the velocities $v_{18}$ and $v_{20}$ may be the same value and the roadway 70 may be straight; consequently, computer(s) 26 of drones 12-16 may determine to not alter the configuration 22—and process 500 may proceed to block 554. However, in other examples, the velocities $v_{18}$ and $v_{20}$ may differ, the roadway 70 may not be straight, the vehicles 18, 20 may be approaching different obstructions 21, or the like. Consequently, circumstances may have changed making it desirable (e.g., or even more optimal) to update the configuration 22 before proceeding. In this latter instance, the process 500 may proceed first to block 552.

Block 552 may be identical to block 520; therefore, it will not be re-discussed here. As a result of block 552, one or more of the drone computers 26 may store new phase delay parameters, may maintain a new configuration, may have a new position and orientation with respect to vehicle 18 and/or 20, etc. Following block 552, the process proceeds to block 554.

In block 554, computer(s) 26 of drones 12-16 may determine to facilitate a relaying a reply message from vehicle 20 to vehicle 18. In block 554, computer(s) 26 of drones 12-16 may switch the transceiver 48 again to the receive mode, and focus antenna beams 74, 78, 82 on vehicle 20.

And in block 556, via computer(s) 26, each of drones 12-16 may receive a wireless signal carrying the reply message from vehicle 20. This signal may be reconstructed according to instructions (e.g., using respective computers 26) similar to those discussed above so that the message may be provided to vehicle 18 (e.g., using determined phase delay parameters, conformal wavefronts, etc.). Thus, in at least some examples, drones 12-16 may be used repeatedly to send communications back and forth between vehicles 18, 20. Thereafter, the process 500 may end.

Accordingly, it should be appreciated that operation of drones 12-16 may be correlated to a so-called synthetic aperture array—each having a different three-dimensional position and orientation, and each moving with respect to a frame of reference that includes points P1, P2, etc. on the ground 56. Similar to synthetic aperture arrays, the more drones that are used in the configuration 22 discussed above, the higher the strength and/or quality of the reconstructed signal and also the higher the strength and/or quality of the signal received by the recipient vehicle.

Other examples exist as well. According to one example, block 550 could occur between blocks 544 and blocks 546; i.e., the drones could alter the configuration 22 after receiving the wireless signals from vehicle 18 but before transmitting the reconstructed signal to vehicle 20.

In another example, one or more additional sets of drones could be used extend the range between vehicles 18 and 20. For example, a first set of drones may determine a configuration, receive the wireless signal from vehicle 18, and then transmit a reconstructed signal to a second set of drones. The second set, having its own configuration, could receive the reconstructed wireless signal and transmit it to vehicle 20. Of course, one or more intermediary sets of drones could be spaced between the first and second sets as well (e.g., to further extend wireless range).

Thus, there has been described a drone communication system which may be used for vehicle-to-vehicle (V2V) communication between two vehicles. Using the system, the vehicles may communicate when range and/or obstructions might otherwise inhibit wireless communication.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:
determining, relative to a first vehicle and a second vehicle, a drone configuration of a plurality of drones to minimize phase delay between the plurality and the first vehicle, between the plurality and the second vehicle, or both;
receiving, at each of the plurality, a message from the first vehicle; and
transmitting, to the second vehicle, the message via a conformal wavefront, the wavefront being based on the configuration and respective-drone phase delays.

2. The method of claim 1, wherein receiving the message further comprises reconstructing the message using a first set of phase delay parameters, wherein each parameter is associated with one of the plurality and the first vehicle.

3. The method of claim 1, wherein the receiving further comprises focusing an antenna reception beam of each of the plurality on the first vehicle.

4. The method of claim 1, wherein transmitting the message further comprises calculating a second set of phase delay parameters, wherein each parameter is associated with one of the plurality and the second vehicle.

5. The method of claim 1, wherein the transmitting further comprises focusing an antenna transmission beam of each of the plurality on the second vehicle.

6. The method of claim 1, further comprising, prior to determining the configuration, determining to establish drone-to-drone communication among the plurality.

7. The method of claim 1, further comprising, prior to determining the configuration, determining to assist in vehicle-to-vehicle communication between the first and second vehicles.

8. The method of claim 1, further comprising maintaining the configuration while receiving and transmitting the message and while the first and second vehicles are moving.

9. The method of claim 1, further comprising altering the configuration to minimize phase delay between the plurality and the second vehicle prior to receiving, from the second vehicle, a reply message intended for the first vehicle.

10. A system, comprising:
a plurality of drones each having a processor and memory storing instruction executable by the respective processors, the respective instructions comprising, to:
determine, relative to a first vehicle and a second vehicle, a drone configuration of the plurality to minimize phase delay between the plurality and the first vehicle, between the plurality and the second vehicle, or both;
receive, at each of the plurality, a message from the first vehicle; and
transmit, to the second vehicle, the message via a conformal wavefront, the wavefront being based on the configuration and respective-drone phase delays.

11. The system of claim 10, wherein the instructions further comprise: while receiving, to focus an antenna reception beam of each of the plurality on the first vehicle; and while transmitting, to focus an antenna transmission beam of each of the plurality on the second vehicle.

12. The system of claim 10, wherein the instructions further comprise: prior to determining the configuration, to determine to establish drone-to-drone communication among the plurality.

13. The system of claim 10, wherein the instructions further comprise: prior to determining the configuration, to determine to assist in vehicle-to-vehicle communication between the first and second vehicles.

14. The system of claim 10, wherein the instructions further comprise: alter the configuration to minimize phase delay between the plurality and the second vehicle prior to receiving, from the second vehicle, a reply message intended for the first vehicle.

15. A system, comprising:
a plurality of drones each having a processor and memory storing instruction executable by the respective processors, the respective instructions comprising, to:
determine, relative to a first vehicle and a second vehicle, a drone configuration of the plurality;
receive, at each of the plurality, a message from the first vehicle by reconstructing the message using a first set of phase delay parameters, wherein each parameter is associated with one of the plurality and the first vehicle; and
transmit, to the second vehicle, the message via a conformal wavefront, the wavefront being based on the configuration and respective-drone phase delays.

16. The system of claim 15, wherein the instructions further comprise to transmit the message by calculating a second set of phase delay parameters, wherein each parameter is associated with one of the plurality and the second vehicle.

17. A system, comprising:
a plurality of drones each having a processor and memory storing instruction executable by the respective processors, the respective instructions comprising, to:
determine, relative to a first vehicle and a second vehicle, a drone configuration of the plurality;
receive, at each of the plurality, a message from the first vehicle;
transmit, to the second vehicle, the message via a conformal wavefront, the wavefront being based on the configuration and respective-drone phase delays; and
alter the configuration to minimize phase delay between the plurality and the second vehicle prior to receiving, from the second vehicle, a reply message intended for the first vehicle.

* * * * *